June 28, 1927.

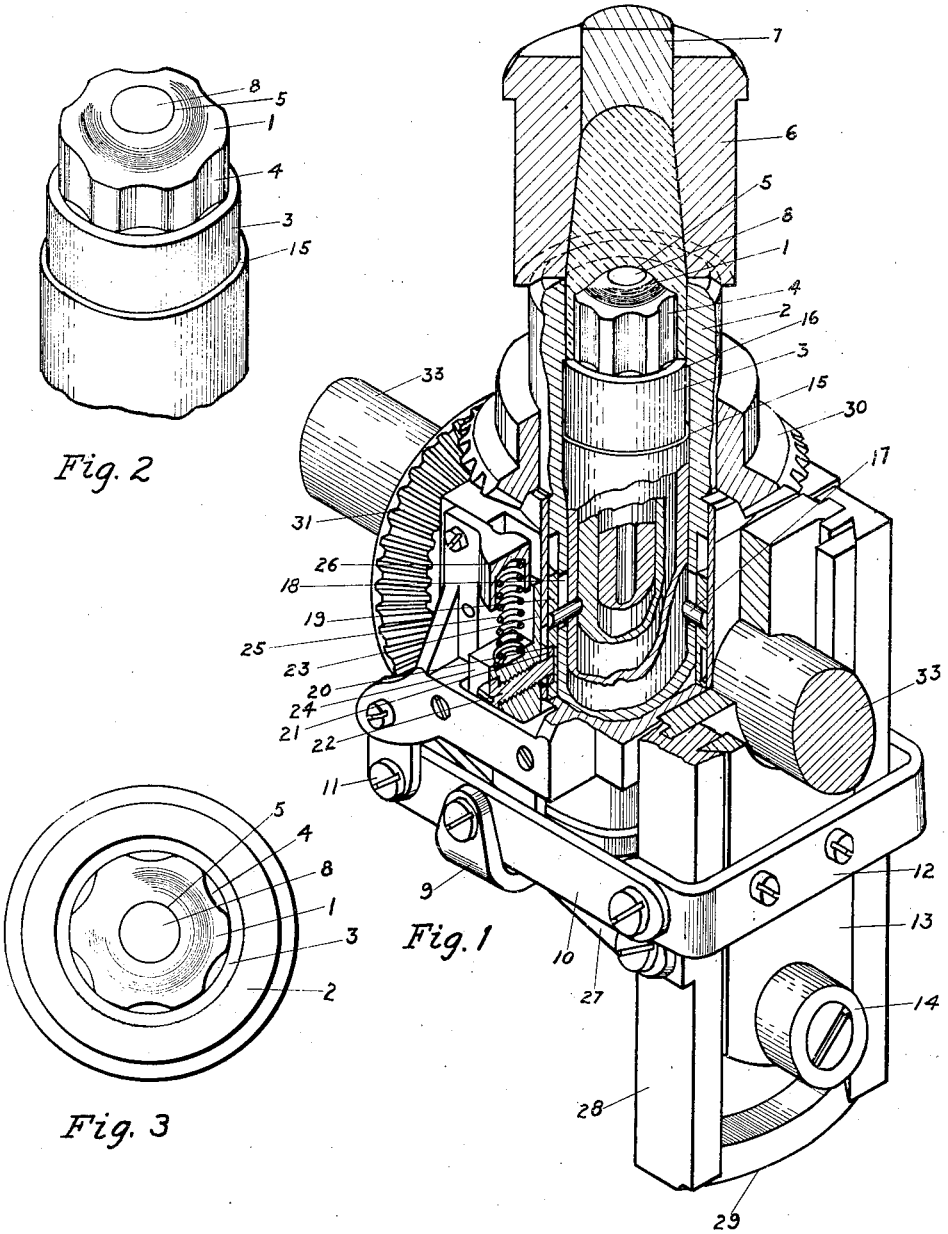

O. A. HANFORD 1,633,634

GLASS-FORMING MACHINE AND PROCESS

Filed April 14, 1921

Orin A. Hanford INVENTOR.

BY

Edwin P. Corbett ATTORNEY.

Patented June 28, 1927.

1,633,634

UNITED STATES PATENT OFFICE.

ORIN A. HANFORD, OF COLUMBUS, OHIO, ASSIGNOR TO THE FEDERAL GLASS COMPANY, OF COLUMBUS, OHIO, A CORPORATION OF OHIO.

GLASS-FORMING MACHINE AND PROCESS.

Application filed April 14, 1921. Serial No. 461,268.

My invention relates to glass forming machines and has to do particularly with the provision of novel method and apparatus for reception of a glass blank, the support of such blank while it is being subjected to the various forming operations and discharge of the blank at any time. It is more particularly useful in the formation of glass articles by blowing.

In the making of blown glass-ware by machine, it has been customary to hold the blank during subjection to the various forming actions by a collar structure formed of separate cooperative jaws. This collar structure is invariably provided with internal flutes in the form of transverse ribs or grooves which positively preclude release of the blank except by spreading of the jaws of the collar structure. Therefore, a means is provided for spreading these jaws at the termination of the forming operations. The structure is unnecessarily complicated and undesirable.

I have met and solved the problem of holding these blanks in a different way. Instead of holding the blanks by separable fluted jaws, I have discovered that the blank can be firmly held if one of its ends is pressed firmly onto a cylindrical post or into a cylindrical one-piece sleeve. Therefore, I have devised a blank holding device which preferably takes the form of a cylindrical post surrounded by a cylindrical sleeve whose inner wall is in spaced concentric relation to the outer wall of such post. Between these walls and forming a non-yielding base for the space thus formed, I have mounted an ejector sleeve that may be moved forwardly to eject the blank at any time. My device is further provided either in the outer wall of the post or in the inner wall of the sleeve with longitudinal flutes that preclude relative rotation of the blank about these supporting elements. These flutes are such, however, that the blank may be ejected longitudinally of its supports without difficulty.

The device which I preferably utilize in my novel method of supporting is shown in the accompanying drawings wherein similar characters of reference designate corresponding parts and wherein—

Figure 1 is a perspective view partially broken away of a blowing head embodying my blank supporting structure and illustrating one method that may be used by the air forcing the glass blank down into the glass supporting head.

Figure 2 is a perspective view of my glass supporting head with the enclosing cylindrical sleeve removed so as to show the structure of the cylindrical post with its longitudinal flutes therein and enclosed by the ejector sleeve.

Figure 3 is an end elevation of my glass supporting head.

Figure 4:
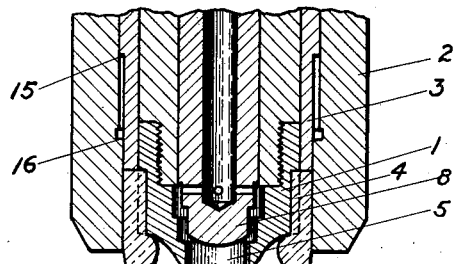
Figure 4 is a vertical sectional view illustrating the internal structure of the glass supporting head in inverted position and showing the blank depending therefrom in the approximate position which exists immediately prior to the final blowing of the article.

In the drawings, referring particularly to Figure 1, it will be observed that the main features of my glass supporting head are the substantially cylindrical post 1, the enclosing sleeve 2 and the ejector sleeve 3. The post 1 is preferably provided with a number of longitudinal flutes or grooves 4 and with a rounded head having a central hole 5 within which operates a controlling pin, to be described, that serves as a plug for closing the opening while the glass is being pressed onto the blowing head. The flutes may be placed in the interior wall of the sleeve 2 instead of in the walls of the post 1 or these flutes may be provided in both of these opposing walls.

The sleeve 2 encloses the post 1 in concentric relation thereto and its internal diameter is such that an annular space or channel is thereby provided between the exterior longitudinal wall of the post and the interior longitudinal wall of the sleeve.

The ejecting sleeve 3 is disposed between the post 1 and the sleeve 2. When in withdrawn position, as when the glass blank is being pressed onto the head, this sleeve terminates a substantial distance below the outer ends of the post 1 and the sleeve 2. In this position it forms an unyielding base for the annular groove or channel in between the post 1 and the sleeve 2. This sleeve 3, however, is capable of movement toward the outer ends of this post and sleeve and this movement is utilized for ejecting the blank either after the formation of the article is completed or at any time during the various steps leading to the final formation of such article.

Cooperating with the glass receiving head for affixing the glass blanks thereto, I desirably utilize a mold 6 that may take various forms and that is designed to be superimposed upon the sleeve 2 in the manner shown in Figure 1. When this mold is in position, glass is dropped therein and a plunger 7 is moved downwardly into the mold to force the glass downwardly into the glass holding head and particularly into the annular groove between the post 1 and sleeve 2 until this glass finally contacts with the ejector sleeve as shown in Figure 1.

For the purpose of this application, the interior of the post structure hardly requires an extended explanation. It will be sufficient to say that the hole or opening 5 is subject to closure by the plug 8 (see Figures 4 and 5) and that this closure is only effective during the forcing of the glass downwardly into the receiving head. At other times, this plug 8 is withdrawn to the position shown in Figures 4 and 5 so that air or other expanding fluid may be introduced through the hole or opening 5 and into the blank. This reciprocation of the plug 8 is effected by a structure partially illustrated in Figure 1 which comprises a yoke 9 pivoted to a lever 10 on opposite sides of the blowing head which are fulcrumed at 11 and are in turn connected by a cross-yoke 12 secured to the reciprocable slide 13. It will be readily understood that the elevation of this slide will force the plug 8 into position to close the opening 5 and this is automatically accomplished as the receiving head moves to charging position by means of a cam (not shown) which operates upon the cam roller 14.

The ejector sleeve 3 is provided at a suitable distance from its outer end with a shoulder 15 that cooperates with a shoulder 16 in the interior wall of the sleeve 2 for limiting the ejectment movement of the ejector. This ejector sleeve is movable to effect ejectment of the blank at the proper time through the medium of the pins 17 which extend through slots 18 in an extension of the sleeve 2 and are embedded in a slidable sleeve or collar 19. The sleeve or collar 19 is provided with an annular groove 20 within which fit segmental members 21 that permit of rotation of the post 1, sleeve 2, sleeve 3 and sleeve 19 and yet makes possible the movement of the sleeve 19 longitudinally of the post 1 and sleeve 2 with a consequent movement of the ejector sleeve 3 longitudinally of such post 1 and sleeve 2.

Figure 5:
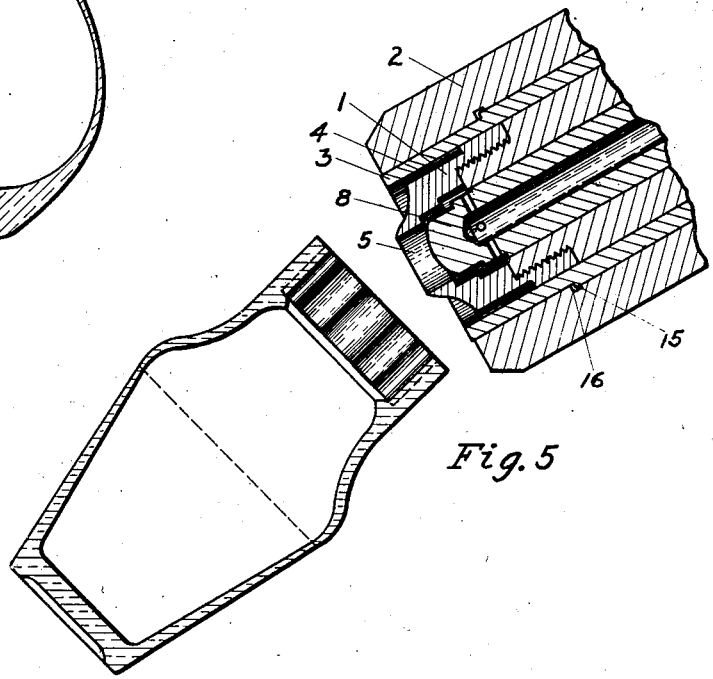
Figure 5 is a sectional elevation showing the relation of the blowing blank and the position of the various parts of the glass supporting head immediately after the article has been ejected, this ejectment being preferably performed with the head at an angle of thirty degrees from the horizontal, although it may be effected in practically any position.

The segmental members 21 are provided with apertures into which extend pins 22 whose outer portions are threaded so that they may be screwed into slides 23. These slides 23 are provided with block or shoulder formations 24 upon the outer surfaces of which are spring seats for the reception of coil springs 25. These coil springs 25 set at their outer ends in bearings 26 with the result that the slides 23 are normally held in the position shown in Figure 1 and because of this holding the ejector sleeve withdraws as shown in Figure 1. The slides 23 are connected at their interior ends to levers 27 which are in turn connected to a yoke-like slide member 28 having at its innermost end a shoe formation 29. This shoe formation is designed to cooperate with a presser foot which becomes effective as the blowing unit moves to discharge position, although this position of the member 28 may be effected manually at any stage of the operation of the forming of the article. In either event, the application of sufficient pressure upon the shoe-like member 29 will result in forcing the ejector outwardly and in the expulsion of the blank or article as shown in Figure 5.

It will be noted that the sleeve 2 is provided with a miter gear 30 that may be driven by a miter gear 31 to rotate the blowing unit about its own axis. In practice, means is provided for positively driving the blowing unit about the axis of the trunnions 32 and 33.

It will be obvious that I have provided a novel method of producing a support for glass blanks as well as a novel device for supporting and ejecting such blanks. I have departed entirely from the old and erroneous theory that the blank could only be held subject to ready ejectment by collars or slides having transverse flutes or equivalent indentations. It will further be obvious that I have provided a ready means for packing the glass into a receiving groove of such nature that the blanks may be held against rotation with relation to the blowing head but will be held against removal purely by friction which may be easily overcome by the ejector that forms a part of the apparatus. It will also be obvious that my device disposes entirely with the separable jaw structure previously referred to.

It will be understood that in using the term "annular groove" in the specification and claims that I do not limit myself to a groove whose walls are circular but that such term is broad enough to include any groove which forms a closed path.

The diameter referred to in the term "unvarying diameter" as used in the claims is the diameter determined by diametrically opposite points spaced longitudinally along the periphery of the glass holding means.

Having thus described my invention, what I claim is:

1. A glass holding device comprising a head having an annular groove therein, one of the side walls of the said groove being provided with longitudinal flutes.

2. A glass holding device for supporting a blank during manipulation comprising a head having an annular groove therein, one of the side walls of said groove having means to prevent rotation but to permit ejectment.

3. The method of handling glass blanks in the making of blown glassware which comprises forcing the glass into a groove, supporting the glass by friction against force of gravity, blowing the blank while suspended from the holding device and then ejecting the glass from said groove.

4. The combination of a glass holding means including a post, and a sleeve enclosing said post and spaced therefrom to form a groove, said post and sleeve each being of unvarying diameter throughout its glass engaging surface and immovable one with respect to the other, and means for introducing air into the blank while suspended from said means.

5. The combination of a glass holding means including a non-circular post, and a sleeve enclosing said post and spaced therefrom to form a groove, said post and sleeve each being of unvarying diameter throughout its glass engaging surface and immovable one with respect to the other, and means for introducing air into the blank while suspended from said means.

6. A glass blank holding device comprising a post, a relatively immovable enclosing sleeve spaced therefrom to form a groove for holding and suspending the blank, an ejecting sleeve disposed to move longitudinally of the post and within the space defined by said post and enclosing sleeve, and means for introducing air into said blank during its suspension, said sleeve being formed in one piece.

In testimony whereof, I hereby affix my signature.

ORIN A. HANFORD.